UNITED STATES PATENT OFFICE.

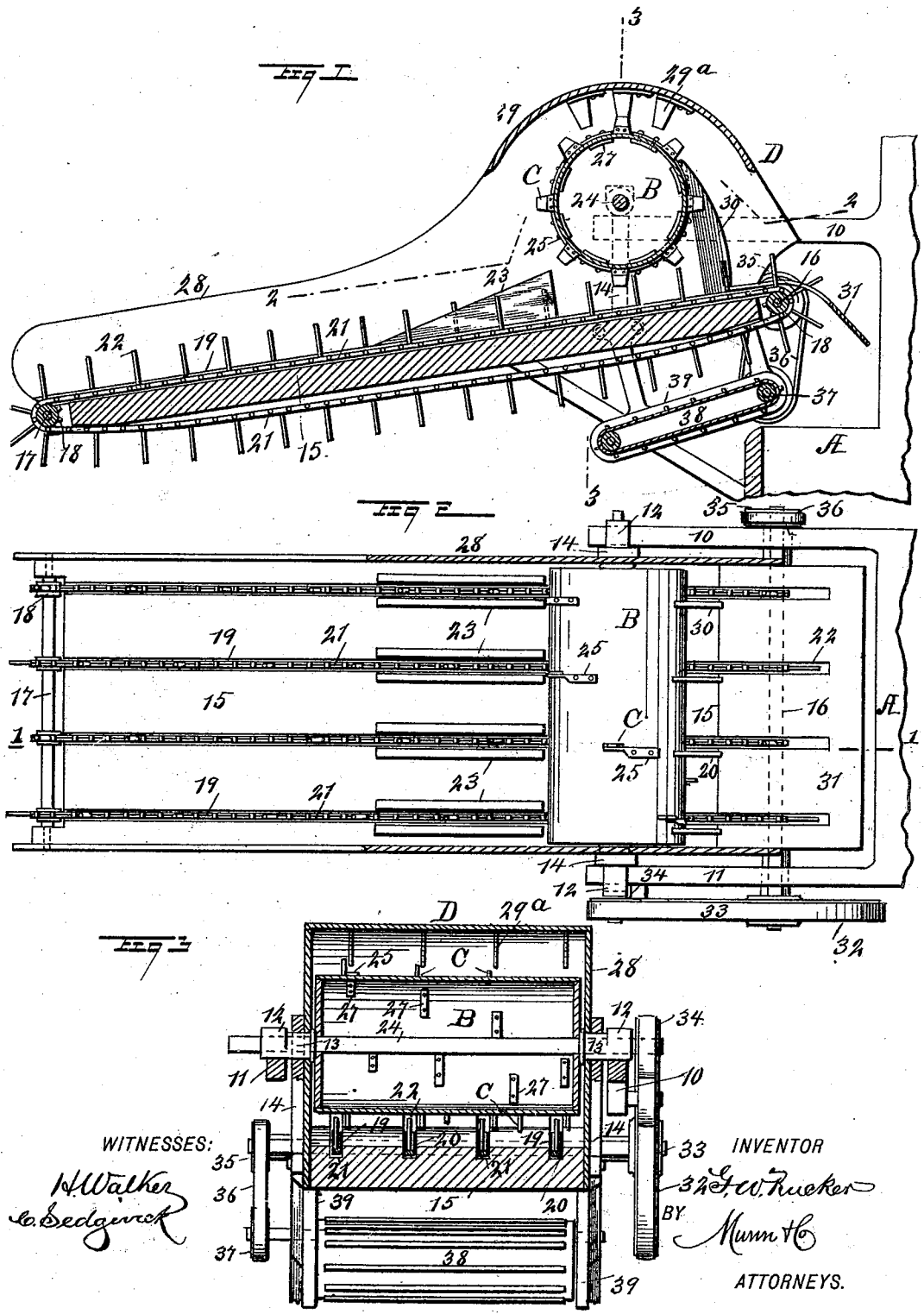

GEORGE WASHINGTON RUCKER, OF BELLE PLAINE, IOWA.

FEEDING ATTACHMENT FOR THRASHING-MACHINES.

SPECIFICATION forming part of Letters Patent No. 501,366, dated July 11, 1893.

Application filed December 1, 1892. Serial No. 453,777. (No model.)

*To all whom it may concern:*

Be it known that I, GEORGE WASHINGTON RUCKER, of Belle Plaine, in the county of Benton and State of Iowa, have invented a new and Improved Feeding Attachment for Thrashing-Machines, of which the following is a full, clear, and exact description.

My invention relates to a feeding attachment to thrashing and similar machines, and has for its object to provide an attachment of simple construction, of light weight and which can be folded over upon the thrasher without removing a belt when the feeder is not required for use, thus avoiding much heavy lifting.

Another object of the invention is to provide a feeder which will deliver any kind of grain fed to it and cut both the bundles and the grain, the latter being passed to the thrasher without loss.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a longitudinal vertical section of the feeder, the section being taken on the line 1—1 of Fig. 2. Fig. 2 is a horizontal section taken on the line 2—2 of Fig. 1; and Fig. 3 is a transverse vertical section on the line 3—3 of Fig. 1.

In carrying out the invention a frame is projected from the thrashing machine A, preferably consisting of two spaced and horizontal arms 10 and 11, carrying at their ends journal boxes 12, which boxes, as shown in Fig. 3, are made in two external diameters, the reduced portion being designated as 13. Two brackets 14, are loosely mounted upon the reduced sections 13 of the boxes. The brackets swing downward, and their lower ends are securely attached to opposite edges of a table 15, which table carries two shafts 16 and 17, one at each end, and these shafts have a series of sprocket wheels 18, or peripherally grooved pulleys firmly mounted upon them, the wheels occupying the same relative position on both shafts. A series of longitudinal grooves or channels 19, is produced in the upper face of the table, the grooves corresponding in number and position to the sprocket wheels 18; therefore a sprocket wheel is opposite each end of each groove. The grooves are preferably provided with metal linings 20, as each groove is adapted to receive an endless-chain carrying belt 21, and each belt is passed over an independent set of the sprocket wheels 18.

The carrying belts are provided with a series of fingers 22, which may be pins or their equivalents secured to the links, as illustrated. The grain to be fed is received between the fingers 22, and is released therefrom, through the medium of sets of stripping boards 23, located one at each side of each table groove, the upper edges of the boards being shaped as inclined planes, and the inclined surfaces of the boards start from the upper face of the table upward in direction of the inner or rear end of the table, as shown in Fig. 1. As the fingers pass between the stripping boards, they carry the grain up the inclined planes of the latter, in order that the bundles and straw may be cut by a cutting device located above and back of the stripping boards. The fingers are entirely freed from the grain by the stripping boards.

The cutting device consists mainly of a knife-carrying cylinder or drum B. The drum is preferably made of light sheet metal well strengthened or stiffened at its ends, and the drum is securely fastened upon a shaft 24, journaled in the boxes 12.

The knives C are ordinarily spirally arranged, and radiate from the drum, standing at right angles thereto, and one or more rows may be employed. Each knife is preferably fastened to a metal bar or plate 25, curved to fit the exterior face of the drum, and beneath each knife bar or plate the drum is reinforced by a block 27, shown in Figs. 1 and 3. The blocks are provided with threaded apertures receiving bolts of any description, which bolts are likewise passed through the knife bars or plates. When knives are fastened to the drum in the above manner they may be readily and conveniently removed to be sharpened, or they may be expeditiously replaced when broken.

The table is provided with side guards 28, made quite high at the drum to support a housing 29, as shown in Fig. 1, and forms a hood D, extending over and beyond the front and rear of the drum, and likewise over the stripping boards. The front and rear of the hood are open. As the cutting drum is rotated the knives cut the straw in lengths, also cut the bands and carry the straw up within the hood to a contact with a series of knives 29ª, secured upon the roof 29, as shown in Figs. 1 and 3. At this point the straw is further cut, and is delivered to the carrying belts, being freed from the drum by a series of fenders 30, located at the rear of the drum and between which the knives of the drum pass. The knives in the hood are stationary, and they are constructed in substantially the same manner as those on the drum. After the grain has been cut it is delivered to the thrashing machine over an apron 31 located at the rear end of the table and projecting over and beyond the inner table shaft. The apron is carried downward and is slotted to permit the fingers of the carrying belt to pass. The apron is preferably made removable and extends into the thrasher. The inner table shaft is the driving shaft, as power is applied to it, and it carries at one end a pulley 32 connected by a belt 33 with a pulley 34 on the drum shaft, and at the opposite end of the shaft a pulley 35 is mounted, connected by a belt 36 with a driving pulley 37, connected with a conveyer 38, located beneath the inner end of the table, the frame 39 of the conveyer being in bracket connection with the sides of the table, so that when the table is reversed the conveyer reverses with it. The conveyer is adapted to receive any grain that may spill from the table, and to carry that grain to the thrashing machine.

When the feeding attachment is not in use it can be folded back upon the thrashing machine, the bearings 12 acting as a pivot.

The feeder is not only simple and durable in construction and can be carried to a position upon the top of a thrasher without even throwing off a belt, but it is also capable of being economically manufactured, and may be applied with ease and dispatch to any thrasher or like machine. The small conveyer is also preferably provided with an apron, similar to apron 31, secured in the sides of the conveyer frame and adapted to deliver the load carried to the thrasher.

Having thus described my invention, I claim as new and desire to secure by Letters Patent—

1. The combination with a thrashing machine, of a cutter fixedly located upon the machine, and a feed table suspended below the cutter and pivotally connected with its bearings, substantially as described.

2. The combination with a thrashing machine provided with a frame projecting therefrom, a shaft mounted in the frame, and a cutter on said shaft, of brackets mounted loosely on the bearings of the said shaft, and a feed table secured to the lower ends of the said brackets, substantially as described.

3. In a feeder for thrashing machines, the combination with a cutter, of a feed table below the cutter, endless carrying belts traveling over the table, and stripping boards between which the belts pass, substantially as described.

4. In a feeder for thrashing and like machines, the combination, with a table, endless carrying belts traveling over the table, and stripping boards between which the belts pass, of rotary knives located above the table and near the stripping boards, and feeders between which the knives pass, substantially as described.

5. In a feeder for thrashing and like machines, the combination, with a table, endless carrying belts traveling over the table, and stripping boards between which the belts pass and provided with inclined upper edges, of a drum mounted to revolve above the table, knives mounted upon the drum, the drum being adjacent to the stripping boards, and stationary knives located within the path of revolution of the drum, substantially as described.

6. In a feeder for thrashing and like machines, the combination, with a series of carrying belts, and a conveyer located beneath the delivery end of the belts, of a knife-carrying drum mounted to revolve above the delivery end of the belts, a series of stationary knives located in the path of revolution of the drums, and stripping or cleaning devices for the belts and knives, substantially as described.

GEORGE WASHINGTON RUCKER.

Witnesses:
JOHN STAPLETON,
S. E. WANGELER.